United States Patent
Kawanami (10) Patent No.: US 9,042,715 B2
(45) Date of Patent: May 26, 2015

(54) INTERCHANGEABLE LENS AND CAMERA SYSTEM

(71) Applicant: CANON KABUSHIKI KAISHA, Tokyo (JP)

(72) Inventor: Akihiro Kawanami, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 28 days.

(21) Appl. No.: 13/744,986

(22) Filed: Jan. 18, 2013

(65) Prior Publication Data

US 2013/0183026 A1    Jul. 18, 2013

(30) Foreign Application Priority Data

Jan. 18, 2012   (JP) ................................ 2012-007684

(51) Int. Cl.
| | |
|---|---|
| G03B 3/00 | (2006.01) |
| G03B 17/00 | (2006.01) |
| G02B 7/02 | (2006.01) |
| G03B 3/10 | (2006.01) |
| G03B 17/14 | (2006.01) |
| G03B 5/00 | (2006.01) |

(52) U.S. Cl.
CPC .... *G03B 3/10* (2013.01); *G03B 17/14* (2013.01); *G03B 5/00* (2013.01); *G03B 2206/00* (2013.01)

(58) Field of Classification Search
USPC .......... 396/90, 529–533; 348/333.01, 333.12, 348/335, 360; 359/819, 827–830
See application file for complete search history.

(56) References Cited

U.S. PATENT DOCUMENTS

| | | | |
|---|---|---|---|
| 6,097,511 A | 8/2000 | Hirasawa et al. | |
| 2004/0202464 A1* | 10/2004 | Miyasaka et al. | 396/529 |
| 2006/0171707 A1* | 8/2006 | Higuma | 396/529 |
| 2007/0189730 A1* | 8/2007 | Okamura | 386/107 |
| 2008/0252751 A1 | 10/2008 | Kawanami | |
| 2010/0110217 A1* | 5/2010 | Shibuno et al. | 348/222.1 |
| 2011/0229117 A1 | 9/2011 | Hirai | |
| 2012/0033955 A1* | 2/2012 | Okada | 396/71 |

FOREIGN PATENT DOCUMENTS

| | | |
|---|---|---|
| CN | 101729773 A | 6/2010 |
| EP | 1795957 A1 | 6/2007 |

(Continued)

OTHER PUBLICATIONS

European search report issued in European counter part application No. EP13151398.8 dated Sep. 2, 2013.

(Continued)

*Primary Examiner* — Rochelle-Ann J Blackman
(74) *Attorney, Agent, or Firm* — Rossi, Kimms & McDowell LLP (57) ABSTRACT

An interchangeable lens attachable to a camera body includes an image pickup optical system configured to form an optical image of an object, and a controller configured to start initializing an optical element included in the image pickup optical system so as to move the optical element to a predetermined position when the controller receives a first signal that commands a start of an initialization from the camera body, and configured to start initializing the optical element after the controller receives identification information from the camera body and a period elapses for which the camera body consumes more than a predetermined amount of power when the controller does not receive the first signal from the camera body.

11 Claims, 4 Drawing Sheets

(56) References Cited

FOREIGN PATENT DOCUMENTS

| | | |
|---|---|---|
| EP | 2088767 A2 | 8/2009 |
| JP | 11-064956 A | 3/1999 |
| JP | 2000-075385 A | 3/2000 |
| JP | 2000147361 A | 5/2000 |
| JP | 2005-295152 A | 10/2005 |

OTHER PUBLICATIONS

Japanese Office Action for corresponding JP 2012-007684, mail date May 20, 2014.

Official Action issued in CN201310013431.7, mailed Feb. 27, 2015. English translation provided.

* cited by examiner

INTERCHANGEABLE LENS AND CAMERA SYSTEM

BACKGROUND OF THE INVENTION

1. Field of the Invention

The present invention relates to an interchangeable lens and a camera system that includes an interchangeable lens and a camera body.

2. Description of the Related Art

Japanese Patent Laid-Open No. ("JP") 11-64956 discloses a camera system in which when an interchangeable lens is attached to a camera body, they communicate with each other for information exchanges and initialize a lens in parallel processing. The "initialization of the lens," as used herein, means moving of a zoom lens or a focus lens to a predetermined position.

JP 11-94956 expedites booting-up of the camera system through the parallel processing, but the parallel processing requires the lens to be initialized before the information exchange between the interchangeable lens and the camera body is completed (or before the specifications and functions are mutually recognized). Thereby, several malfunctions may occur.

For example, when the initialization of the lens is started before powering-on of the camera is completed, the initialization of the lens may fail. In addition, if the initialization of the lens is earlier than expected or if the initialization of the lens is unnecessary, the lens starts an unintended operation and the camera system may become inoperable. Moreover, when the initialization of the lens and the boot-up of the camera body or other processing are simultaneously performed, the camera system runs short of power and the camera body may stop or is reset. These problems are likely to occur particularly when an interchangeable lens of a new specification is attached to a camera body of an old specification that does not support the new specification.

SUMMARY OF THE INVENTION

Accordingly, the present invention provides an interchangeable lens and a camera system in which an initialization of an optical element included in an image pickup optical system can be normally performed.

An interchangeable lens attachable to a camera body according to the present invention includes an image pickup optical system configured to form an optical image of an object, and a controller configured to start initializing an optical element included in the image pickup optical system so as to move the optical element to a predetermined position when the controller receives a first signal that commands a start of an initialization from the camera body, and configured to start initializing the optical element after the controller receives identification information from the camera body and a period elapses for which the camera body consumes more than a predetermined amount of power when the controller does not receive the first signal from the camera body.

Further features of the present invention will become apparent from the following description of exemplary embodiments with reference to the attached drawings.

DESCRIPTION OF THE EMBODIMENTS

Figure 1:
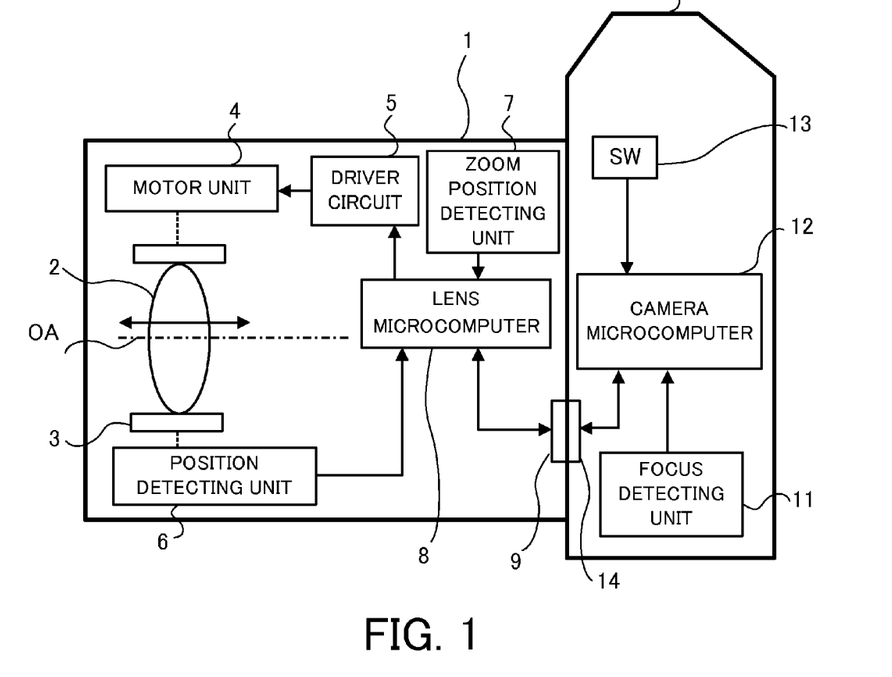
FIG. 1 is a block diagram of a camera system according to this embodiment.

FIG. 1 is a block diagram of a camera system that serves as an image pickup system according to a first embodiment. The camera system includes an interchangeable lens 1, and a camera body 10 as an image pickup apparatus to which the interchangeable lens 1 can be attached.

The interchangeable lens 1 and the camera body 10 are mechanically coupled with each other through a mount (not illustrated), and electrically connected with each other so that they can communicate with each other through a lens contact 9 of the interchangeable lens 1 and a camera contact 14 of the camera body 10. The type of communication is not limited to electricity, and may utilize another means, such as an optical communication. Through communications, the interchangeable lens 1 and the camera body 10 can exchange information, such as their identification numbers, specifications, and functions. The camera body 10 supplies power to the interchangeable lens 1 through the lens contact 9 and the camera contact 14.

The interchangeable lens 1 includes an image pickup optical system that includes a plurality of optical lens units, and forms an optical image of an object. The image pickup optical system includes a focus lens 2, a zoom lens, a correcting lens for image stabilization, a diaphragm, etc., but FIG. 1 illustrates only the focus lens 2 for simplicity purposes. Each of the focus lens 2, the zoom lens, etc. actually includes a plurality of lenses and is assembled into a unit.

The focus lens 2 is moved by a focus unit 3 in a direction of the optical axis OA for focusing, and the zoom lens (magnification-varying lens) is moved in the optical axis direction so as to change a focal length. The correcting lens is moved in the direction orthogonal to the optical axis for image stabilization. As long as the "orthogonal direction" has a component orthogonal to the optical axis, the orthogonal direction may contain a component oblique to the optical axis. The diaphragm is configured to adjust a light intensity incident upon the image pickup element (not illustrated) of the camera 10.

The focus unit 3 holds the focus lens 2 so that the focus lens 2 can be moved for autofocusing ("AF") in the optical axis direction.

The interchangeable lens 1 further includes a motor unit 4, a driver circuit 5, a position detecting unit 6, a zoom position detecting unit 7, and a lens microcomputer 8.

The motor unit 4 is an actuator configured to move the focus unit 3. In an example, the motor unit 4 is an electromagnetic type stepping motor that includes a component configured to convert the rotating power of the motor into moving power of the focus unit 3, and its driving is controlled by voltage supplied by the driver circuit 5. The driver circuit 5 converts an exciting signal from the lens microcomputer 8 into power, and supplies it to the motor unit 4. The motor unit 4 and the driver circuit 5 serve as a driver configured to drive the focus lens 2.

The position detecting unit 6 detects a position of the focus unit 3. In an example, part of the focus unit 3 is cut out, the position detecting unit 6 is configured as a photo-interrupter that includes a light emitting element and a light receiving element, and the optical path of the photo-interrupter can pass the cutout. The lens microcomputer 8 obtains a signal level that varies depending upon whether the light from the light emitting element reaches the light receiving element in the photo-interrupter or blocked.

Figure 2:
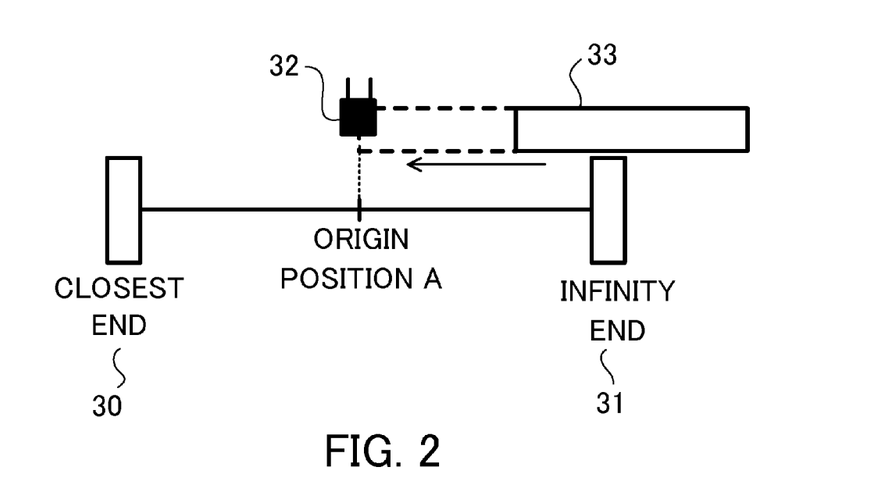
FIG. 2 is an operational principal view of a focus unit and a position detecting unit illustrated in FIG. 1.

FIG. 2 is an operational principal view of the focus unit 3 and the position detecting unit 6. A moving range of the focus unit 3 is limited between the closest end 30 and infinity end 31. The focus unit 3 is controlled in such a way that it is stopped when it reaches one of these ends. Each end is determined by a moving amount from an origin position A.

A center of an optical path of the photo-interrupter 32 as the position detecting unit 6 passes the origin position A. A light shielding plate 33 that moves together with the focus unit 3 is configured to cross the optical path of the photo-interrupter 32. The light shielding plate 33 shields the optical path of the photo-interrupter 32 when the focus unit 3 is located on the closest side and the optical path of the photo-interrupter 32 exposes when the focus unit 3 is located on the infinity side.

Thereby, whether the focus unit 3 is located on the closest side or on the infinity side can be determined. Since the absolute position of the focus unit 3 is specified at the origin position A at which the signal of the photo-interrupter 32 changes, the lens microcomputer 8 stores a predetermined amount from the origin position A as an origin. The position detecting unit 6 of this embodiment is thus a relative position detector configured to detect the position of the focus unit 3 based upon the relative distance from the origin position A, and does not include an encoder configured to detect an absolute distance. As a result, the position detecting unit 6 can be made smaller.

For example, the lens microcomputer 8 stores the step 10,000 when the signal of the photo-interrupter 32 changes (when it passes the origin position A). When the focus unit 3 moves to the closest side, a value is decremented from the step 10,000, and when it moves to the infinity side, a value is incremented from the step 10,000. In addition, the lens microcomputer 8 recognizes, for example, the closest end 30 as the step 5,000 and the infinity end 31 as the step 15,000, and stops the focus unit 3.

Unless the origin position A is known, the moving amount of the focus unit 3 is unknown. Then, the focus unit 3 may move beyond the closest end 30 or the infinity end 31 and collide with another member. As a result, the focus unit 3, the motor unit 4, or the other member may get damaged.

Accordingly, it is necessary to identify the origin position A before the focus unit 3 is moved (before the user operates the switch 13), and the origin position A is identified when the camera body 10 is attached to the interchangeable lens 1, when the camera (not illustrated) is powered on, or the like. A series of controls used to identify the origin position A is referred to as a focus reset control, and performed as part of initialization of the optical element. In the initialization of the optical element, the focus lens 2 is moved to the predetermined position on the basis of the origin position A.

In the initialization of the optical element, another optical element (such as the zoom lens, the correcting lens, and the diaphragm) other than the focus lens 2 included in the image pickup optical system is moved to a predetermined position. In the initialization of the diaphragm, diaphragm blades of the diaphragm are moved to the predetermined positions and a diaphragm aperture is set to a predetermined value. Since the initialization of the other optical element is similar to the focus lens 2, a description will now be given only of the focus lens 2. In addition, the initialization of the focus lens 2 of this embodiment includes the identification of the origin position A but the initialization of the optical element may or may not include the identification of the origin position A.

The focus reset control is a system installed in a relatively new interchangeable lens, and there are a camera body 10 having an old specification that does not support the focus reset control and a camera body 10 having a new specification that supports the focus reset control. It is necessary for the interchangeable lens 1 to normally initialize the optical element even when the interchangeable lens 1 is attached to any one of the cameras of these specifications.

It is herein conceivable that the lens microcomputer 8 determines the boot timing of the initialization of the optical element, but the power circuit containing the battery etc. is generally provided into the camera body and the malfunction may occur.

For example, if the initialization of the optical element of the interchangeable lens 1 is performed simultaneous with the boot-up of the camera body or the flashing power charging, the camera system may run short of the power and the camera body may be stopped or reset.

Accordingly, when the interchangeable lens 1 is attached to the camera body that does not support the focus reset control, the interchangeable lens 1 initializes the optical element in a period other than the power consuming period of the camera body. On the other hand, when the interchangeable lens 1 is attached to the camera body that supports the focus reset control, the camera body provides controls such that the optical element of the interchangeable lens is not initialized in the power consuming period of the camera body. When the camera body controls the timing of the initialization of the optical element of the interchangeable lens, the boot-up of the camera system can be expedited.

The zoom position detecting unit 7 electrically detects a variation state when the optical magnification varies as the zoom lens (not illustrated) moves. Usually, in zooming (magnification variation), the adjustment of the focusing state of the object becomes necessary with the magnification.

The lens microcomputer 8 is a microcomputer, such as a CPU (processor), and serves as a controller configured to control each component in the interchangeable lens 1. The lens microcomputer 8 provides controls so as to move the focus unit 3 and to maintain a focusing state in accordance with a zoom state detected by the zoom position detecting unit 7. The series of control will be referred to as a computer zoom control ("CZ control") hereinafter.

The lens microcomputer 8 of the interchangeable lens 1 of this embodiment supports the CZ control. The lens microcomputer 8 serves as a communication circuit, reset exceptional processing, A/D, a timer, input/output ports, a ROM, and a RAM for communications between the interchangeable lens 1 and the camera body 10. The communication circuit communicates lens identification information and lens operational permission command with the camera body 10. Moreover, the lens microcomputer 8 controls driving of the optical element, such as the focus unit 3 and the diaphragm (not illustrated), utilizing a variety of types of control information obtained via the communication circuit.

The camera body 10 includes a focus detecting unit 11, a camera microcomputer 12, a variety of types of switches (SW) 13 used to provide commands relating to the image pickup, and an image pickup element configured to photoelectrically convert the optical image formed by the image pickup optical system.

The focus detecting unit 11 is a focus detector configured to detect a focusing state based upon a defocus amount at the current position of the focus unit 3 for the object distance. The focus detecting method is not limited and may include a contrast method and a phase difference method.

The camera microcomputer 12 is a microcomputer, such as a CPU (processor), and serves as a controller configured to control each component in the camera body 10. The camera microcomputer 12 serves as a communication controller for communications with the lens microcomputer 8, an A/D, a current detector, a timer, a power supply switch to the lens, input/output ports, a ROM, and a RAM.

The lens microcomputer 8 and the camera microcomputer 12 exchange a variety of types of data utilizing a clock synchronization type of a serial communication function, and each of them includes an input terminal, an output terminal, and a synchronizing clock input terminal. In synchronization with the clock signal, 1-bite (8-bit) information is exchanged for one communication.

The switch 13 transmits an AF starting command and an image pickup starting command from the user to the camera microcomputer 12. In the AF, in accordance with the operations of the switch 13, the camera microcomputer 12 obtains information of a defocus amount of the object image from the focus detecting unit 11, calculates a moving amount of the focus unit 3 based upon the information from the lens microcomputer 8, and sends a moving command to the lens microcomputer 8.

When receiving a moving command of the focus unit 3 from the camera microcomputer 12, the lens microcomputer 8 issues an electrification command to the driver circuit 5, drives the motor unit 4, and moves the focus unit 3.

The moving amount of the focus unit 3 is detected by counting the electrification phase of the stepping motor in the motor unit 4, driving of the motor unit 4 is stopped when the focus unit 3 is moved by the moving amount specified by the camera microcomputer 12, and moving of the focus unit 3 is stopped. In general, the 1-2 phase driving method is one driving method of the stepping motor. The moving amount of the focus unit 3 is detected through counting at the electrification phase switching timing, such as the 1-phase electrification, 2-phase electrification, 1-phase electrification, and the like. The minimum unit of the moving amount is herein a step amount.

A description will now be given of embodiments of the present invention with reference to the accompanying drawings.

First Embodiment

Figure 3:
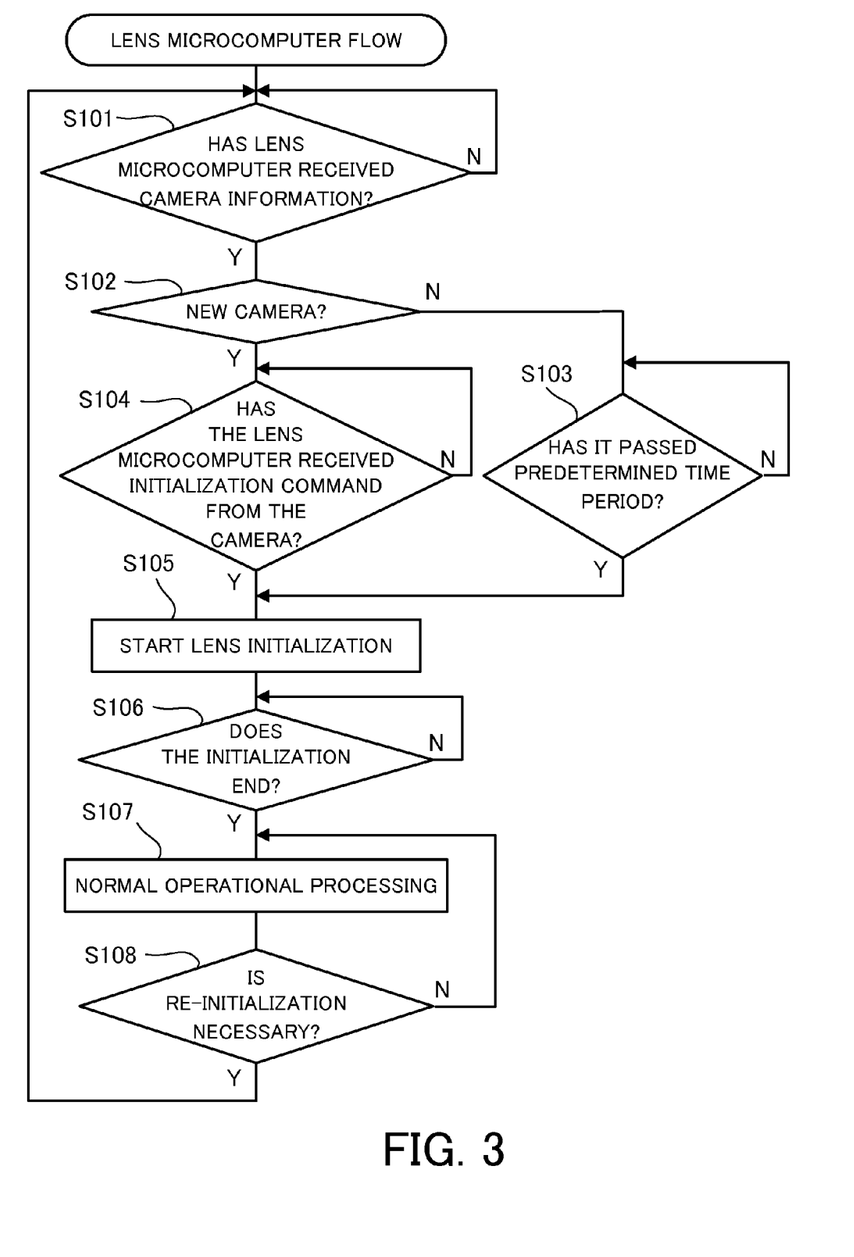
FIG. 3 is a flowchart illustrating a lens initialization control performed by a lens microcomputer illustrated in FIG. 1 according to a first embodiment.

FIG. 3 is a flowchart of the initialization control by the lens microcomputer 8 according to the first embodiment, and "S" stands for the step. The flowchart illustrated in FIG. 3 can be implemented as a program that enables a computer to execute a function of each step.

When the interchangeable lens 1 is attached to the camera body 10, the lens microcomputer 8 determines whether the lens microcomputer 8 has received from the camera microcomputer 12 camera information representing whether the camera has a new specification that supports the focus reset control (or whether the camera body is a "new camera" hereinafter) (S101).

The "camera information," as used herein, is identification information of the camera body 10, and the identification information contains not only the identification number of the camera body 10 but also additional information (such as information of attached accessory). In S101, the lens microcomputer 8 sends information of the interchangeable lens 1 to the camera body 10. This information contains the identification information of the interchangeable lens 1, and the identification information contains information of whether the optical element of the interchangeable lens 1 needs initialization.

When the camera body 10 is a new camera (Y of S102), the lens microcomputer 8 stands by until it receives the initialization command from the camera microcomputer 12 (N of S104), and when the camera body 10 is an old camera (N of S102), the lens microcomputer stands by until a predetermined time period has passed (N of S103). The "old camera" means a camera of an old specification that does not support the focus reset control. In other words, the new specification is a specification in which the camera body 10 sends an initialization command which will be described later, and the old specification is a specification in which the camera body does not send the initialization command which will be described later.

The "predetermined time period" in S103 is a value stored in the lens microcomputer 8, which is different for each camera body, and corresponds to a period for which the camera body 10 consumes more than the predetermined amount of power. Thereby, the optical element of the interchangeable lens 1 can be initialized in a period except for the power consuming period of the camera body 10 (although FIG. 3 simply illustrates the "lens initialization" because the initialization of the optical element is the initialization of the focus lens 2 in FIG. 3).

For example, the "predetermined period" in S103 is a boot-up period of the camera body 10. When the camera body 10 has completed the flashing power charge (this information is contained in the camera information in S101), the predetermined time period is a period necessary to finish power charging. Of course, the predetermined time period is not limited to a period necessary for the power running and the flashing power charging and may be a period for which a certain optical element in the camera body 10 consumes a predetermined amount of power or higher.

The lens microcomputer 8 can determine whether the predetermined time period stored in the lens microcomputer 8 has passed by measuring the time utilizing the timer (not illustrated) or counting the clock signal.

The "initialization command" in S104 is a first signal issued after the power consuming period of the camera body 10 is completed and allows the interchangeable lens 1 to start initializing the optical element.

When the lens microcomputer 8 receives the initialization command (Y of S104) or when the predetermined period has passed (Y of S103), the lens microcomputer 8 starts initializing the lens (S105), and stands by until the initialization is completed (N of S106). When the initialization is completed (Y of S105), the normal processing follows, such as AF, (S107), and when the re-initialization becomes necessary (Y of S108), the flow returns to S107 and while the re-initialization is unnecessary, the flow returns to S107.

A description will be given of an example of the re-initialization (or re-focus reset control) in S108. In FIG. 2, the origin position A is set to the step 10,000 in an example so that the signal of the photo-interrupter 32 can be changed at the step 10,000 of the moving amount of the focus unit 3. However, when the motor unit 4 (stepping motor) steps out and a relationship destroys between the rotating amount of the motor and the electric exciting phase, the step amount shifts and the signal of the photo-interrupter does not change at the step 10,000. As a consequence, the focus unit 3 may move beyond the closest end 30 or the infinity end 31. Accordingly, the re-initialization (or the re-focus reset control) is performed in S108 so as to set the origin position A to the step 10,000.

While this embodiment determines in S102 whether the camera body 10 is a new camera or an old camera, this determination is not always necessary. For example, instead of S102, the lens microcomputer 8 determines whether the lens microcomputer 8 has received the initialization command from the camera microcomputer 12 within the predetermined time period of S103. When the lens microcomputer 8 has received the initialization command, the flow may move to S105, and when the lens microcomputer 8 has not received the initialization command, the flow may move to S105 after the predetermined time period has passed.

Figure 4A:
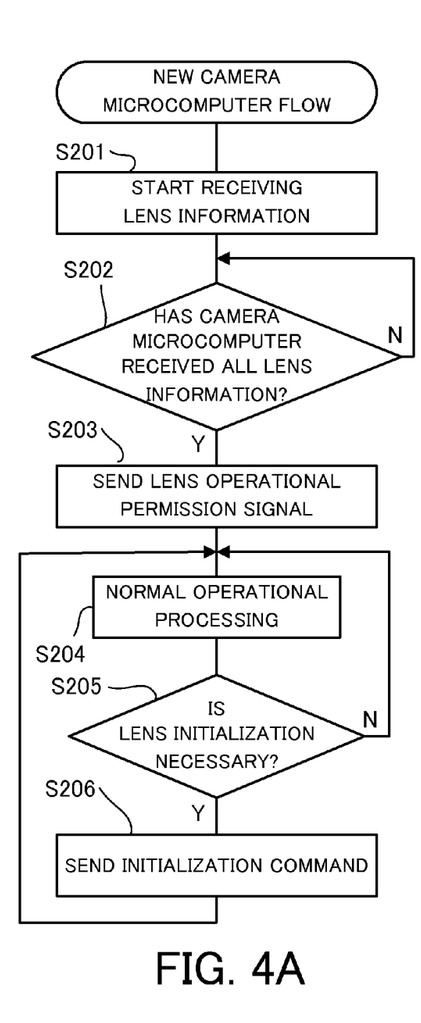
FIGS. 4A and 4B are flowcharts illustrating processing performed by a camera microcomputer corresponding to FIG. 3 according to the first embodiment.
Figure 4B:
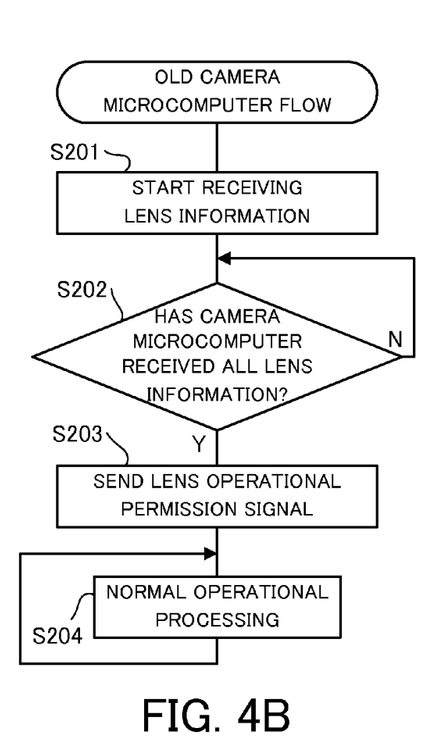

FIGS. 4A and 4B are flowcharts of the processing performed by the camera microcomputer 12 corresponding to the processing of the lens microcomputer 8 illustrated in FIG. 3, and "S" stands for a step. The flowcharts illustrated in FIGS. 4A and 4B can be implemented as a program that enables the computer to execute a function of each step.

FIG. 4A illustrates processing when the camera body 10 is a new camera. In FIG. 4A, when the interchangeable lens 1 is attached to the camera body 10, the camera microcomputer 12 receives information of the lens microcomputer 8 (S201), and sends the camera information. Thereby, the lens microcomputer 8 can recognize that the camera body 10 is the new camera (Y of S102).

Next, the camera microcomputer 12 determines whether the camera microcomputer 12 has received all information from the lens microcomputer 8 (S202). When receiving all information, the camera microcomputer 12 sends an operational permission signal (second signal) to the lens microcomputer 8 after the power consuming period of the camera body 10 elapses (S203).

The "operational permission signal" is effective when the interchangeable lens 1 is independently operable for electric zooming, image stabilization (not illustrated), and the like. When the lens microcomputer 8 receives the operational permission signal, the interchangeable lens 1 becomes in the independently operable state and thus ready for the initialization.

Next, the camera microcomputer 12 performs a normal operation for a camera (S204), and sends the initialization command (S206) when determining that the initialization of the optical element in the interchangeable lens 1 is necessary based upon the lens information received in S201 (Y of S205). This communication allows the interchangeable lens 1 to start the initialization. When the initialization is unnecessary (N of S205), the flow proceeds to S204.

Thus, this embodiment does not immediately sends the initialization command in S203 but sends the initialization command in S205 only when the initialization command is necessary (S206). This configuration prevents the camera body 10 from sending the initialization command to the interchangeable lens that needs no initialization and from causing the failure of the camera system as a result of that the interchangeable lens 1 starts an unintended action.

FIG. 4B illustrates processing when the camera body 10 is an old camera. In FIG. 4B, when the interchangeable lens 1 is attached to the camera body 10, the camera microcomputer 12 receives information of the lens microcomputer 8 (S201) and sends the camera information. Thereby, the lens microcomputer 8 can recognize that the camera body 10 is the old camera (N of S102).

Next, the camera microcomputer 12 determines whether the camera microcomputer 12 has received all information from the lens microcomputer 8 (S202). When receiving all information, the camera computer 12 sends an operational permission signal (second signal) to the lens microcomputer 8 after the power consuming period of the camera body 10 elapses (S203). Next, the camera microcomputer 12 performs a normal operation for the camera (S204).

Second Embodiment

Figure 5:
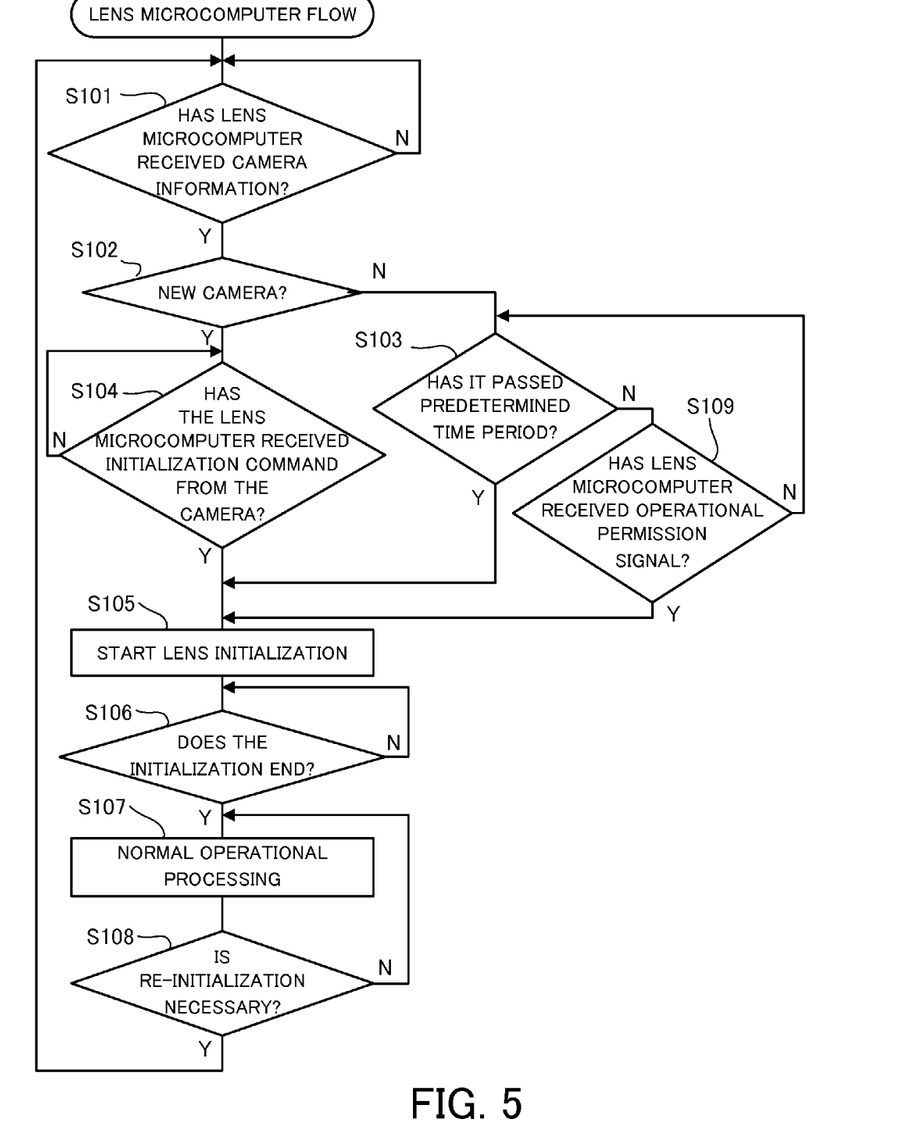
FIG. 5 is a flowchart illustrating a lens initialization control performed by a lens microcomputer illustrated in FIG. 1 according to a second embodiment.

FIG. 5 is a flowchart of the lens initialization control performed by the lens microcomputer 8 according to the second embodiment, and "S" stands for a step. The flowchart illustrated in FIG. 5 can be implemented as a program that enables the computer to execute a function of each step. FIG. 5 is different from FIG. 3 in that FIG. 5 has S109, and similar to FIG. 3 other than S109. Therefore, only the difference will be described.

According to the first embodiment, when the camera is old, S105 is performed after the lens microcomputer receives the camera information and then the predetermined time period elapses (N of S103). In other words, the camera body 10 cannot take an image until the predetermined time period elapses and may miss the object from the field of view. Accordingly, this embodiment shortens a time period necessary to start the initialization.

When the camera body 10 is old (N of S102), and the predetermined time period elapses (Y of S103), the flow proceeds to S105. When the predetermined time period does not elapse (N of S103), the flow proceeds to S105 if the lens microcomputer 8 receives the operational permission command from the camera microcomputer 12 (Y of S109). When the predetermined time period has not elapses (N of S103) and the lens microcomputer 8 has not received the operational permission signal from the camera microcomputer 12 (N of S109), the flow returns to S103. As a result, the initialization can be started earlier when the operational permission signal is received before the predetermined time period elapses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Each of these embodiments enables the lens to be normally initialized, even when the interchangeable lens is attached to the camera body of any specification. In addition, when the interchangeable lens is attached to the new camera, a system having a faster boot speed can be built.

This application claims the benefit of Japanese Patent Application No. 2012-007684, filed Jan. 18, 2012, which is hereby incorporated by reference herein in its entirety.

What is claimed is:

1. An interchangeable lens attachable to a camera body, the interchangeable lens comprising:
   an image pickup optical system configured to form an optical image of an object; and
   a controller configured to:
      start initializing an optical element included in the image pickup optical system to move the optical element to a predetermined position after a signal for starting an initialization is received from the camera body, in a case where the camera body is configured to transmit, to the interchangeable lens, the signal for starting the initialization of the optical element; and
      start initializing the optical element after the controller receives identification information from the camera body and a predetermined period elapses, in a case where the camera body is not configured to transmit, to the interchangeable lens, the signal for starting the initialization.

2. The interchangeable lens according to claim 1, wherein the controller determines:

whether the camera body has a specification that allows sending of the signal for starting the initialization, based upon the identification information received from the camera body; and whether the predetermined period has elapsed after the controller determines that the camera body has a specification that does not permit sending of the signal for starting the initialization.

3. The interchangeable lens according to claim 1, wherein the controller starts initializing the optical element when the controller receives from the camera body a signal that allows the interchangeable lens to independently operate, even when the period has not yet elapsed.

4. The interchangeable lens according to claim 1, wherein the initialization of the optical element contains identifying an origin position of the optical element.

5. The interchangeable lens according to claim 1, wherein the controller sends to the camera body identification information that contains information that the optical element needs initialization.

6. The interchangeable lens according to claim 1, wherein the optical element includes at least one of a focus lens configured to move for focusing, a zoom lens configured to move so as to change a focal length, a correcting lens configured to move for image stabilization, or a diaphragm configured to adjust a light intensity.

7. The interchangeable lens according to claim 1, wherein the controller initializes the optical element at least one of when the interchangeable lens is attached to the camera body, when the camera body to which the interchangeable lens has been attached is powered on, or when a re-initialization becomes necessary.

8. A camera system comprising:
a camera body; and
an interchangeable lens attachable to the camera body, wherein the interchangeable lens includes:
    an image pickup optical system configured to form an optical image of an object; and
    a controller configured to:
        start initializing an optical element included in the image pickup optical system to move the optical element to a predetermined position after a signal for starting an initialization is received from the camera body, in a case where the camera body is configured to transmit, to the interchangeable lens, the signal for starting the initialization of the optical element; and
        start initializing the optical element after the controller receives identification information from the camera body and a predetermined period elapses, in a case where the camera body is not configured to transmit, to the interchangeable lens, the signal for starting the initialization.

9. The camera system according to claim 8, wherein the camera body sends the signal for starting the initialization when identification information received from the interchangeable lens contains information that initialization of the optical element is necessary.

10. An interchangeable lens attachable to a camera body, the interchangeable lens comprising:
an image pickup optical system configured to form an optical image of an object; and
a controller configured to:
    start initializing an optical element included in the image pickup optical system to move the optical element to a predetermined position after a signal for starting an initialization is received from the camera body, in a case where the signal for starting the initialization is received from the camera body before a predetermined period elapses after identification information of the camera body is received from the camera body; and
    start initializing the optical element after the predetermined period elapses, in a case where the signal for starting the initialization is not received from the camera body before the predetermined period elapses after the identification information of the camera body is received from the camera body.

11. A camera system comprising:
a camera body; and
an interchangeable lens attachable to the camera body, wherein the interchangeable lens includes:
    an image pickup optical system configured to form an optical image of an object; and
    a controller configured to:
        start initializing an optical element included in the image pickup optical system to move the optical element to a predetermined position after a signal for starting an initialization is received from the camera body, in a case where the signal for starting the initialization is received from the camera body before a predetermined period elapses after identification information of the camera body is received from the camera body; and
        start initializing the optical element after the predetermined period elapses, in a case where the signal for starting the initialization is not received from the camera body before the predetermined period elapses after the identification information of the camera body is received from the camera body.

* * * * *